Nov. 1, 1927.
G. C. EVANS
1,647,401
AUTOMATIC, PNEUMATIC TIRE PRESSURE MAINTAINER
Filed Aug. 3, 1926
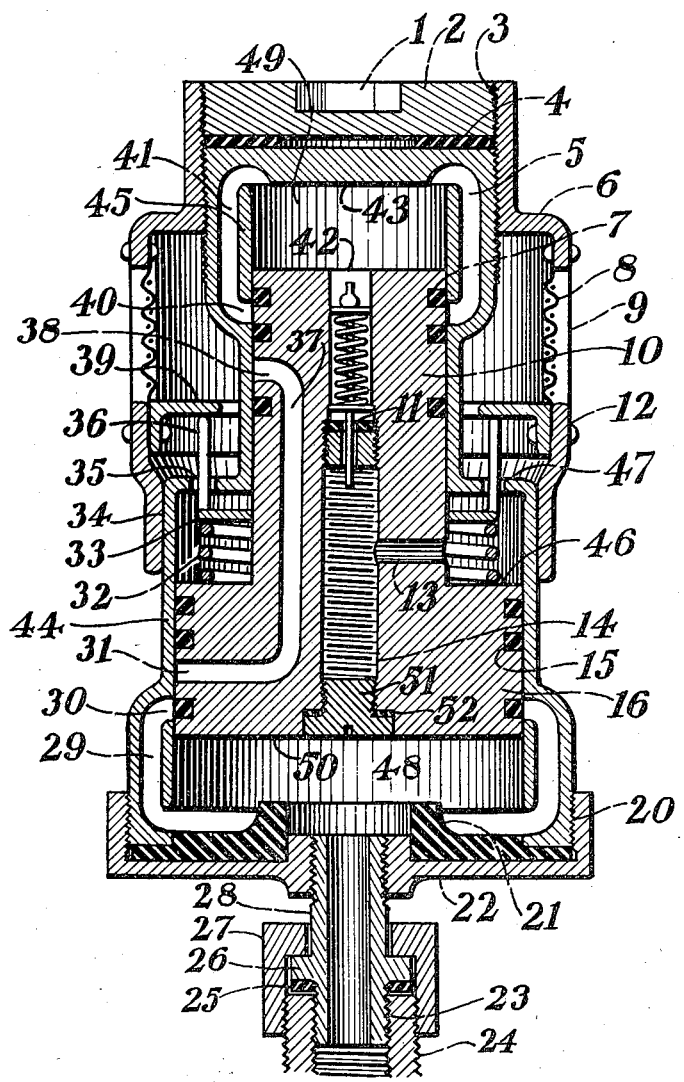
George C. Evans Inventor

Patented Nov. 1, 1927.

1,647,401

UNITED STATES PATENT OFFICE.

GEORGE C. EVANS, OF CRANFORD, NEW JERSEY.

AUTOMATIC, PNEUMATIC TIRE PRESSURE MAINTAINER.

Application filed August 3, 1926. Serial No. 126,878.

The invention relates to an automatic, pneumatic tire pressure maintainer in which the variable abnormal pressure, within the tire, caused by the impact of the tire, under motion, against the inequalities of the roadway's surface, is utilized to increase the sub-normal constant pressure, within the tire, to a predetermined and pre-adjusted normal constant pressure, whensoever the said normal constant tire pressure shall fall below the said predetermined and pre-adjusted normal constant pressure.

The device is automatic in operation and is designed to maintain the tire at a substantially uniform pressure, thus elongating the life of the tire and preserving the proper riding qualities of the vehicle, without attention from the operator. Thru one simple adjustment, the device may be made to adapt itself to tires of different pressure capacities.

One form of the invention is illustrated in the accompanying drawing, in which a vertical section of the device is shown. The main moving element in the device is the stepped cylindrical piston, whose greater diameter is shown at 16 and whose lesser diameter is shown at 10.

The said stepped piston is maintained and reciprocates within the stepped cylinder, whose greater diameter is shown at 44 and whose lesser diameter is shown at 45. The said stepped cylinder has its smaller extremity closed by the end 43 and said stepped cylinder has its larger extremity closed by the base 22, to which base, the said stepped cylinder, is attached by means of the screw threads shown at 20, and by which means and the rubber washer 21, a substantially tight fit is had between said stepped cylinder and said base.

At 15 and 7 are shown compression rings for maintaining a substantially tight fit between the said stepped pistons and the said stepped cylinder, at their respective diameters. At 32 is shown the normal pressure spring, one end of which spring engages against the shoulder 46 of the said stepped piston and the other end of which said spring engages against the adjustment washer 33. The said adjustment washer 33 has three fingers, of which two are shown, one being indicated by 36. The said fingers 36 extend at right angles to the plane of the washer 33 and likewise extend thru the openings 35 in the shoulder 47 of the stepped cylinder. The ends of the said fingers 36 rest against the flange 39. Said flange 39 being attached to the adjustment thimble 6. At 3 is shown the screw thread, by means of which, the adjustment thimble 6 is made to screw up or down, thus increasing or diminishing the pressure, of the normal pressure spring 32. At 2 is shown the lock plug, which serves to lock the adjustment thimble 6 in the proper position. The adjustment thimble 6 extends outwardly from the screw-thread 3 and downward to the greater diameter of the stepped cylinder 44 at which point of contact 34 a substantially tight sliding fit is maintained. The sides of the adjustment thimble are pierced by openings shown at 9. Within the said adjustment thimble and attached to the sides thereof, is the air screen 8 composed of fine mesh screening. The rubber washer 21 serves also as a shock absorber or buffer for the stepped piston 16. At 28 is shown the stem, which stem is threaded externally at 23 to engage within the tire-valve stem 24. The lock-nut 27, the washer 25 and the flange 26 serve to maintain an air-tight fit between the said stem 28 and the said tire-valve stem 24. At 49 is shown the high-pressure chamber and at 48 is shown the low-pressure chamber. In operation the device functions as follows:

The pressure within the tire being increased from sub-normal constant to abnormal variable, by the sudden impact of the tire, when in motion, against the inequalities of the roadway's surface, the said abnormal variable pressure is exerted within the low pressure chamber 48 and against the head 50 of the said stepped piston. The said pressure forces the stepped piston to the upward end of its stroke, overcoming the pressure of the normal pressure spring 32 and compressing atmospheric air in the high pressure chamber 49 to a higher pressure. Since the area of the larger end of the said stepped piston shown at 50 is twice that of the area of said stepped piston's smaller end, at 42, the air compressed within the high-pressure chamber 49 will be compressed to a pressure twice that of the pressure exerted within the low-pressure chamber 48, less of course, the pressure of the normal pressure spring 32. When the said stepped piston reaches the extremity of its upward stroke as above described, the port 38 in the said stepped piston coincides with the port 40 in the said stepped cylinder, upon which the compressed air in the high pressure chamber 49 passes thru the by-pass 41, the port 40, the port 38 and thence into the passage 37. When the abnormal variable pressure in the low-pressure chamber 48 returns to subnormal constant, the normal pressure spring 32 forces the stepped piston to the return position of its stroke and the communications between the said ports and by-pass, as described, ceases, while a new charge of air at atmospheric pressure is admitted thru the air screen 8, the opening 35, the intake port 13, the intake passage 14, the intake valve 11 and thence into the high pressure chamber 49.

When the stepped piston has returned downward, near the extremity of its return stroke the port 31 coincides with the port 30, upon which the compressed air in the passage 37 escapes thru the ports 31 and 30 and the pass 29 into the low pressure chamber 48, which chamber has communication with the tire thru the stem 28. At 51 is shown the intake valve-screw cap and at 52 the washer for said cap. At 1 is shown the nut-shaped socket for manipulating the lock-plug 2. At 12 is shown the rivet for attaching the flange 39 to the side of the adjustment thimble 6.

I claim:

In an automatic, pneumatic tire pressure maintainer, a stepped piston contained and reciprocating within a stepped cylinder, a high pressure chamber, a low pressure chamber, compression rings on the said stepped piston to maintain a substantially tight fit between the said stepped piston and the said stepped cylinder, a by-pass in the wall of the said stepped cylinder at the said stepped cylinder's larger end, a by-pass in the wall of the said stepped cylinder at the said stepped cylinder's smaller end, a by-pass in the said stepped piston said by-pass so shaped and so located as to communicate alternately with the said by-passes in the walls of the said stepped cylinder when the said stepped piston is at the ends of its stroke, a passage in the said stepped piston, a valve within the said passage, the said passage and the said valve giving communication between the atmosphere and the said high pressure chamber, a spring, said spring causing the said stepped piston to return to one end of its stroke, an adjuster to increase or diminish the tension of said spring, a stem forming a passage for the communication of air between the said tire and the said tire pressure maintainer.

GEORGE C. EVANS.